US006684525B2

(12) United States Patent
DeSimone et al.

(10) Patent No.: US 6,684,525 B2
(45) Date of Patent: Feb. 3, 2004

(54) PHOSPHATE FLUOROSURFACTANTS FOR USE IN CARBON DIOXIDE

(75) Inventors: Joseph M. DeSimone, Chapel Hill, NC (US); Jason S. Keiper, Hoffman Estates, IL (US)

(73) Assignees: University of North Carolina at Chapel Hill, Chapel Hill, NC (US); North Carolina State University, Raleigh, NC (US)

( * ) Notice: Subject to any disclaimer, the term of this patent is extended or adjusted under 35 U.S.C. 154(b) by 204 days.

(21) Appl. No.: 09/962,385

(22) Filed: Sep. 25, 2001

(65) Prior Publication Data

US 2002/0107159 A1 Aug. 8, 2002

Related U.S. Application Data

(60) Provisional application No. 60/235,516, filed on Sep. 26, 2000.

(51) Int. Cl.[7] ............................................... B08B 3/00
(52) U.S. Cl. ............................. 34/329; 510/175; 134/3; 438/906
(58) Field of Search ...................... 134/2, 3; 438/906; 34/329; 510/175

(56) References Cited

U.S. PATENT DOCUMENTS

| | | | |
|---|---|---|---|
| 5,344,930 A | 9/1994 | Riess et al. ................. 544/84 |
| 5,573,757 A | 11/1996 | Riess et al. ............... 424/78.02 |
| 5,648,362 A | 7/1997 | Riess et al. ................ 514/292 |
| 5,650,393 A | 7/1997 | Pavia et al. ................ 480/143 |
| 5,676,705 A | 10/1997 | Jureller et al. ................. 8/142 |
| 5,679,459 A | 10/1997 | Riess et al. ............... 428/402.2 |
| 5,683,473 A | 11/1997 | Jureller et al. ................. 8/142 |
| 5,733,526 A | 3/1998 | Trevino et al. ............. 424/9.52 |
| 5,846,516 A | 12/1998 | Riess et al. .................. 424/935 |
| 5,858,022 A | 1/1999 | Romack et al. ................. 8/142 |
| 5,904,933 A | 5/1999 | Riess et al. ................. 424/450 |
| 5,965,258 A | 10/1999 | Riess et al. ................. 428/364 |
| 5,980,936 A | 11/1999 | Krafft et al. ................. 424/450 |
| 6,114,295 A | 9/2000 | Murphy ...................... 510/286 |
| 6,398,875 B1 * | 6/2002 | Cotte et al. ..................... 134/2 |
| 6,562,146 B1 * | 5/2003 | DeYoung et al. ............. 134/30 |

FOREIGN PATENT DOCUMENTS

| | | | |
|---|---|---|---|
| WO | 90/15807 | 12/1990 | ............ C07F/9/10 |
| WO | 95/09606 | 4/1995 | ............ A61K/9/00 |
| WO | 97/03644 | 2/1997 | ............ A61K/7/48 |

OTHER PUBLICATIONS

International Search Report for PCT/US01/29812, Date of mailing Jan. 3, 2002.
Consani et al.; "Observations on the Solubility of Surfactants and Related Molecules in Carbon Dioxide at 50 °C", *The Journal of Supercritical Fluids*, 3 (2): 51–65 (1990).
DuPont, "DuPont™ Zonyl® Flurosurfactants," DuPont, 1–12 (2001).
DuPont, "DuPont™ Zonyl® FSP Flurosurfactant," DuPont, 1–6 (2001).

(List continued on next page.)

*Primary Examiner*—Gregory Webb
(74) *Attorney, Agent, or Firm*—Myers Bigel Sibley & Sajovec, P.A.

(57) ABSTRACT

A method of removing water from a composition of matter comprises contacting a first composition of matter comprising water with a second composition of matter comprising: (1) at least one surfactant comprising at least one phosphate group and (2) a solvent comprising carbon dioxide, wherein at least a portion of the surfactant is soluble in the solvent, such that the at least one surfactant removes at least a portion of the water from the first composition

21 Claims, 9 Drawing Sheets

$^{31}$P NMR spectra of [2-(*F*-hexyl)ethyl]dimorpholinophosphate before (top) and after (bottom) being solubilized in carbon dioxide.

OTHER PUBLICATIONS

Eastoe et al.; "Droplet Structure in a Water–in–$CO_2$ Microemulsion," *Langmuir*, 12 (6): 1423–1424 (1996).

Eastoe et al.; "Fluoro–surfactants at air/water and water/$CO_2$ interfaces," *Physical Chemistry Chemical Physics.*, 2 (22): 5235–5242 (2000).

Eastoe et al.; "Water–in– $CO_2$ Microemulsions Studied by Small–Angle Neutron Scattering," *Langmuir*, 13 (26): 6980–6984 (1997).

Giulieri et al.; "Can the formation of vesicles from single–chain perfluoroalkylated amphiphiles be predicted?" *Colloids and Surfaces A: Physicochemical and Engineering Aspects*, 84: 121–127 (1994).

Harrison et al.; "Water–in–Carbon Dioxide Microemulsions with a Fluorocarbon–Hydrocarbon Hybrid Surfactant," *Langmuir*, 10 (10): 3536–3641 (1994).

Holmes et al.; "Bioconversions in a Water–in–$CO_2$ Microemulsion," *Langmuir*, 14 (22): 6371–6376 (1998).

Holmes et al.; "Synthesis of Cadmium Sulfide Q Particles in Water–in–$CO_2$ Microemulsions," *Langmuir*, 15 (20): 6613–6615 (1999).

Imae et al.; "Phase Separation in Hybrid Langmuir–Blodgett Films of Perfluorinated and Hydrogenated Amphiphiles. Examination by Atomic Force Microscopy," *Langmuir*, 16 (2): 612–621 (2000).

Imae et al.; "Fibril–vesicle transition and their structures–investigation by microscopy and small–angle scattering," *Progr Colloid Polym Sci*, 106: 52–56 (1997).

Jacobson et al.; "Organic Synthesis in Water/Carbon Dioxide Microemulsions," *J. Org. Chem.*, 64 (4): 1201–1206 (1999).

Ji et al.; "Synthesizing and Dispersing Silver Nanoparticles in a Water–in–Supercritical Carbon Dioxide Microemulsion," *J. Am. Chem. Soc.*, 121 (11): 2631–2632 (1999).

Johnston et al.; "Water–in–Carbon Dioxide Microemulsions: An Environment for Hydrophiles Including Proteins," *Science*, 271: 624–626 (1996).

Kane et al.; "Performance of Cholesterol Oxidase Sequestered within Reverse Micelles Formed in Supercritical Carbon Dioxide," *Langmuir*, 16 (11): 4901–4905 (2000).

Krafft et al.; "Highly fluorinated amphiphiles and colloidal systems, and their applications in the biomedical field. A contribution" *Biochimie*, 80 (5–6): 489–514 (1998).

Krafft et al.; "Enhanced Proclivity to self–aggregation of phosphorus–based amphiphiles when perfluoroalkylated: the (perfluoroalkyl)alkyldimorpholinophosphates," *Phosphorus, Sulfur and Silicon*, 109–110: 281–284 (1996).

Krafft et al.; "Supramolecular assemblies from single–chain perfluoroalkylated phosphorylated amphiphiles," *Colloids and Surfaces A: Physicochemical and Engineering Aspects*, 84: 113–119 (1994).

Lee D. et al.; "Diffusive Transport of Micelles and Monomeric Solutes in Supercritical $CO_2$," *J. Am. Chem. Soc.*, 123 (34): 8406–8407 (2001).

Lee Jr. et al.; "Percolation in Concentrated Water–in–Carbon Dioxide Microemulsions," *J. Org. Chem. B*, 104 (18): 4448–4456 (2000).

Lee Jr. et al.; "Droplet Interactions in Water–in–Carbon Dioxide Microemulsions Near the Critical Point: A Small–Angle Neutron Scattering Study," *J. Phys. Chem. B*, 105 (17): 3540–3548 (2001).

Liu et al.; "Water in Carbon Dioxide Microemulsions with Fluorinated Analogues of AOT," *Langmuir*, 17 (2): 274–277 (2001).

Ohde et al.; "Voltammetric Measurement in Supercritical $CO_2$ Utilizing a Water–in–$CO_2$ Microemulsion," *Anal. Chem.*, 72 (19): 4738–4741 (2000).

Romsted et al., "Quantitative Treatment of Indicator Equilibria in Micellar Solutions of Sodium Decyl Phosphate and Sodium Lauryl Sulfate," *J. Phys Chem.*: 92 (16): 4690–4698 (1988).

Sadtler et al.; "Micellization and Adsorption of Fluorinated Amphiphiles: Questioning the $ICF_2 \approx 1.5 CH_2$ Rule," *Chem. EurJ.*: 4 (10): 1952–1956 (1998).

Sadtler et al.; "Perfluoroalkylated amphiphiles with a morpholinophosphate or a dimorpholinophosphate polar head group," *New J. Chem.*: 609–613 (1998).

Salaniwal et al.; "Self–Assembly of Reverse Micelles in Water/Surfactant/Carbon Dioxide Systems by Molecular Simulation," *Langmuir*, 15 (16): 5188–5192 (1999).

Szlávik et al.; "The Preparation of Methyl 9–iodo–perfluorononanoate: an Access to Reverse Fluorinated Amphiphiles," *Tetrahedron Letters*, 38 (50): 8757–8760 (1997).

Wagenaar et al.; "Synthesis and Vesicle Formation of Identical– and Mixed–Chain Di–n–alkyl Phosphate Amphiphiles," *J. Org. Chem.*, 54 (11): 2638–2642 (1989).

Zielinski et al.; "A Small–Angle Neutron Scattering Study of Water in Carbon Dioxide Microemulsions," *Langmuir*, 13 (15): 3934–3937 (1997).

* cited by examiner

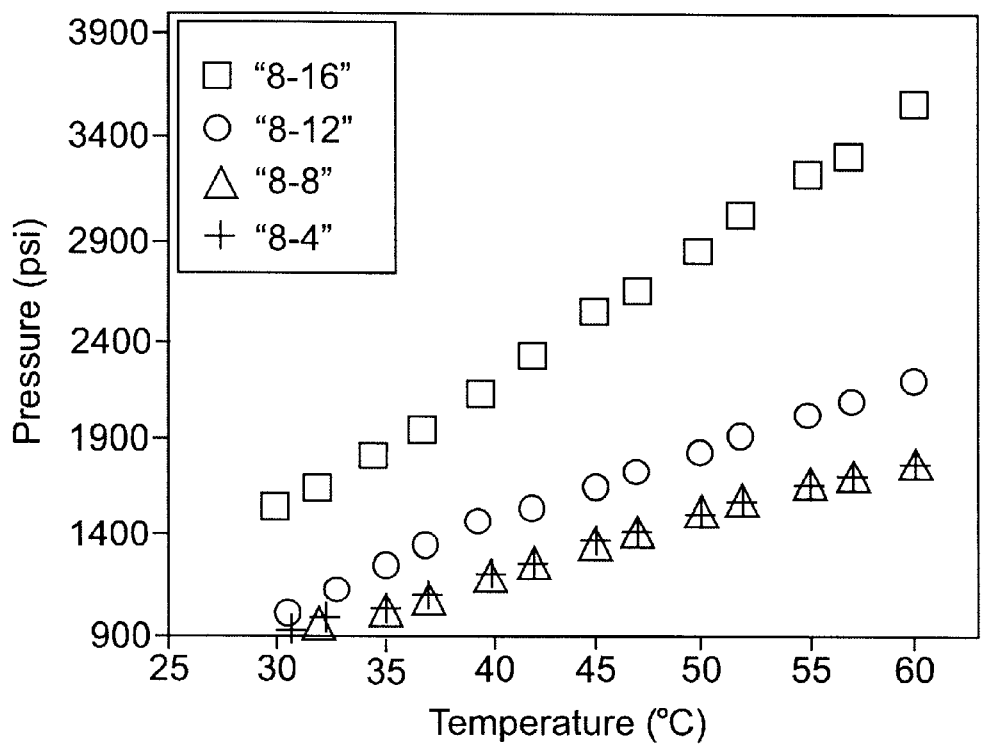
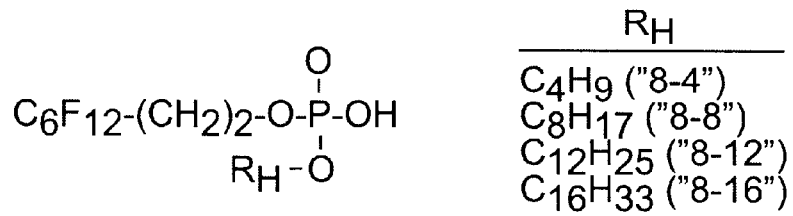
FIG. 2.

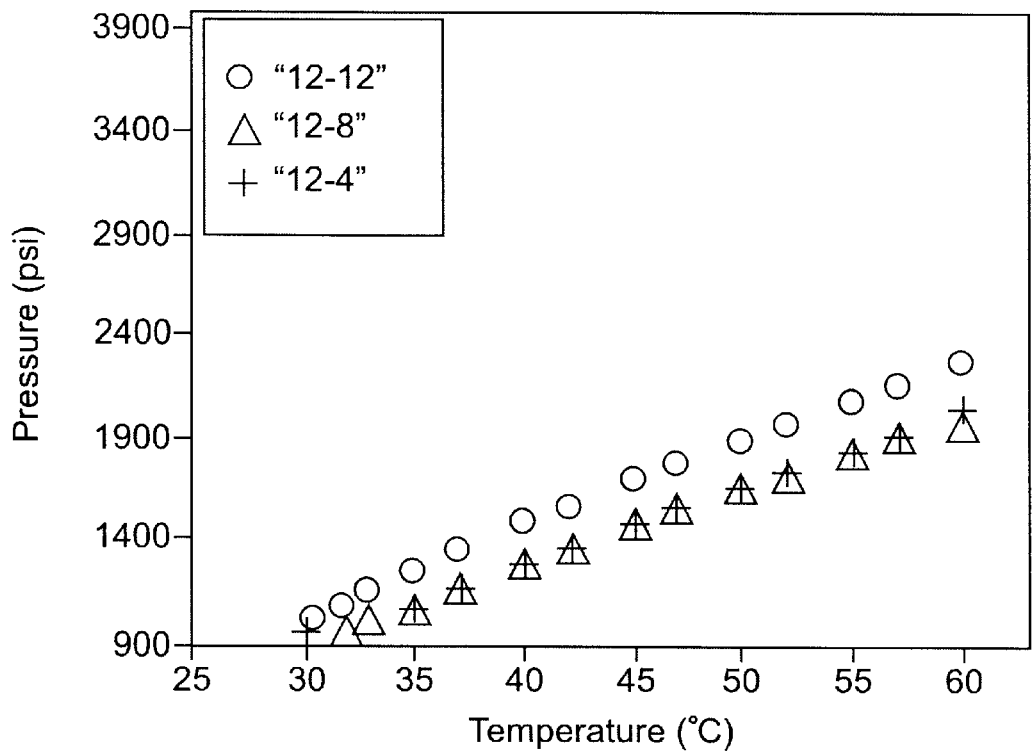
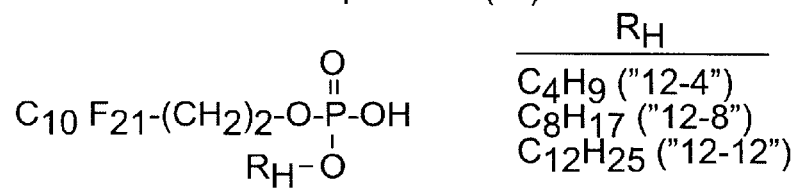
FIG. 3.

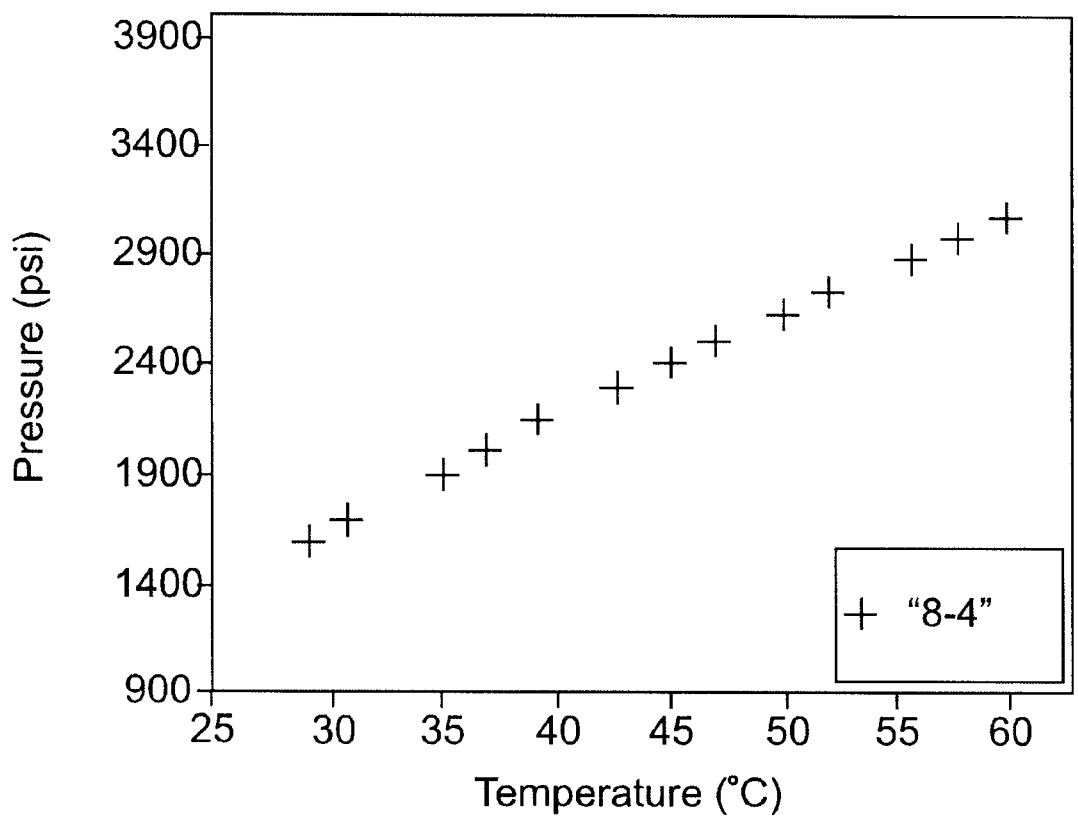
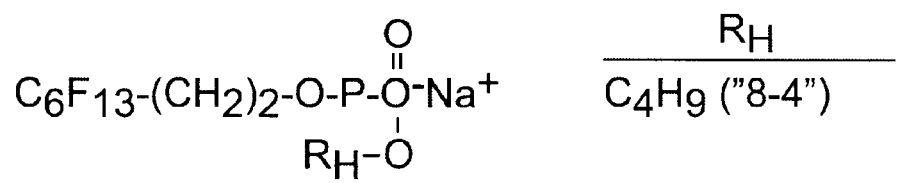
| | $R_H$ |
|---|---|
| $C_6F_{13}\text{-}(CH_2)_2\text{-}O\text{-}P(=O)(O^-Na^+)(O\text{-}R_H)$ | $C_4H_9$ ("8-4") |
FIG. 4.

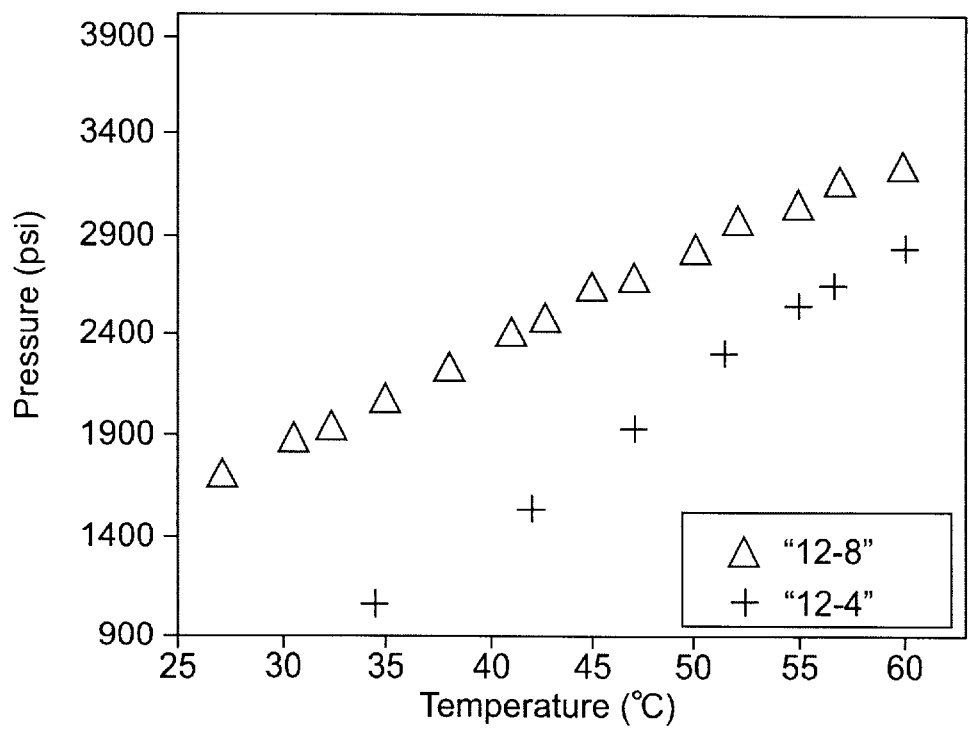
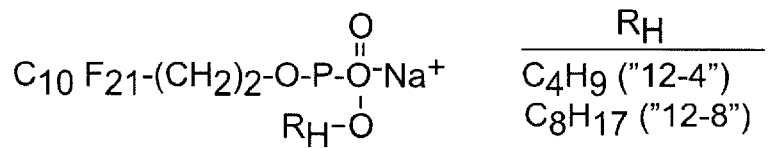
FIG. 5.

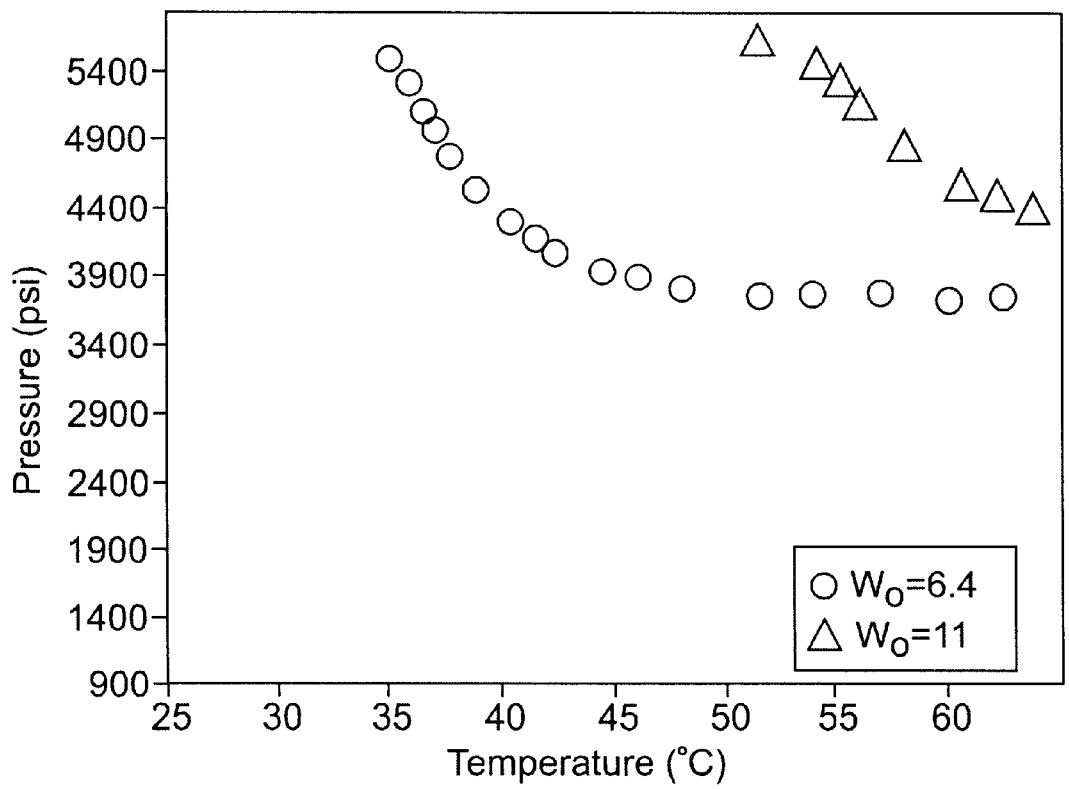
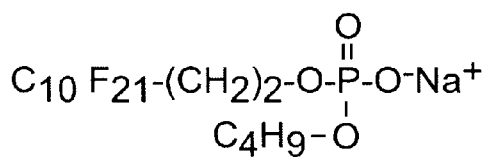
2.5 wt.% in $CO_2$
$W_o = \dfrac{\text{moles } H_2O}{\text{moles surf.}}$
FIG. 6.

$$C_{10}F_{21}\text{-}(CH_2)_2\text{-}O\text{-}\overset{\overset{O}{\|}}{\underset{\underset{C_8H_{17}\text{-}O}{|}}{P}}\text{-}O^-Na^+$$

2.5 wt.% in $CO_2$ $W_o = \dfrac{\text{moles H}_2\text{O}}{\text{moles surf.}}$ $$C_6F_{13}\text{-}(CH_2)_2\text{-}O\text{-}\overset{\overset{O}{\|}}{\underset{|}{P}}\text{-}O^-Na^+$$
$$C_6F_{13}(CH_2)_2\ \ O$$

2.5 wt.% in $CO_2$ $W_o = \dfrac{\text{moles } H_2O}{\text{moles surf.}}$

PHOSPHATE FLUOROSURFACTANTS FOR USE IN CARBON DIOXIDE

CROSS-REFERENCE TO RELATED APPLICATIONS

The present application claims priority to Provisional Application Ser. No. 60/235,516 filed Sep. 26, 2000, the disclosure of which is incorporated herein by reference in its entirety.

FIELD OF THE INVENTION

The present invention generally relates to surfactants that exhibit solubility in carbon dioxide, and systems utilizing the same.

BACKGROUND OF THE INVENTION

The use of carbon dioxide as a clean, abundant, and tunable solvent is potentially environmentally beneficial, and accordingly it is being investigated in a number of applications including, for example, cleaning protocols, coatings, and polymer production and processing. See e.g., Wells, S. L.; DeSimone, J. *Angew. Chem. Int. Ed.* 2001, 40, 518. Notwithstanding the above potential benefits, carbon dioxide is often limited in that many materials such as water exhibit limited solubility therein.

In response to these possible solubility limitations, fluorosurfactants have been developed to potentially assist in the dispersion of water in carbon dioxide. See e.g., Harrison, K.; Goveas, J.; Johnston, K. P.; O'Rear, E. A. *Langmuir* 1994, 10, 3536, Johnston, K. P.; Harrison, K. L.; Clarke, M. J.; Howdle, S. M.; Heitz, M. P.; Bright, F. V.; Carlier, C.; Randolph, T. W. *Science* 1996, 271, 624, Eastoe, J.; Bayazit, Z.; Martel, S.; Steytler, D. C.; Hennan, R. K. *Langmuir* 1996, 12, 1423, Eastoe, J.; Cazelles, B. M. H.; Steytler, D. C.; Holmes, J. H.; Pitt, A. R.; Wear, T. J.; Heenan, R. K. *Langmuir* 1997, 13, 6980, Zielinski, R. G.; Kline, S. R.; Kaler, E. W.; Rosov, N. *Langmuir* 1997, 13, 3934, Eastoe, J.; Downer, A.; Paul, A.; Steytler, D. C.; Rumsey, E.; Penfold, J.; Heenan, R. K. *Phys. Chem. Chem. Phys.* 2000, 2, 5235, Lee Jr., C. T.; Bhargava, P.; Johnston, K. P. *J. Phys. Chem. B* 2000, 104, 4448, Lee Jr., C. T.; Johnston, K. P.; Dai, H. J.; Cochran, H. D.; Melnichenko, Y. B.; Wignall, G. D. *J. Phys. Chem. B* 2001, 105, 3540, and Liu, Z. -T.; Erkey, C. *Langmuir* 2001, 17, 274. Accordingly, water-in-carbon dioxide (W/C) microemulsions containing appreciable water quantities have been achieved, allowing for their use in a number of applications such as nanoparticle synthesis, organic reactions, voltammetric measurements, and enzymatic conversions. See e.g., Holmes, J. D.; Bhargava, P. A.; Korgel, B. A.; Johnston, K. P. *Langmuir* 1999, 15, 6613, Ji, M.; Chen, X.; Wai, C. M.; Fulton, J. L. *J. Am. Chem. Soc.* 1999, 121, 2631, Jacobson, G. B.; Lee Jr., C. T.; Johnston, K. P. *J. Org. Chem.* 1999, 64, 1201, Ode, H.; Hunt, F.; Kithara, S.; Way, C. M. *Anal. Chem.* 2000, 72, 4738, Lee, D.; Hutchison, J. C.; Demimonde, J. M.; Murray, R. M. *J. Am. Chem. Soc.* 2001, 123, 8406, Holmes, J. D.; Settler, D. C.; Rees, G. D.; Robinson, B. H. *Languor* 1998, 14, 6371, and Kane, M. A.; Baker, G. A.; Pander, S.; Bright, F. V. *Languor* 2000, 16, 4901. W/C systems have also been the subject of computational treatments. See e.g., Satanically, S.; Cui, S. T.; Cummings, P. T.; Cochran, H. D. *Languor* 1999, 15, 5188.

Nonetheless, inspite of any advantages of these systems, there remains a need in the art for surfactants and systems employing the same that allow for improved volatilization of various materials in carbon dioxide, such as, for example, water.

SUMMARY OF THE INVENTION

In one aspect, the invention provides a method of removing water from a first composition of matter. The method comprises contacting a first composition of matter comprising water with a second composition of matter comprising: (1) at least one surfactant comprising at least one phosphate group and (2) a solvent comprising carbon dioxide, wherein at least a portion of the surfactant is soluble in the solvent, such that the at least one surfactant removes at least a portion of the water from the first composition.

In another aspect, the invention provides a method of applying a surfactant to a substrate. The method comprises providing a composition of matter comprising at least one surfactant comprising (1) at least one phosphate group and (2) a solvent comprising carbon dioxide, wherein at least a portion of the surfactant is soluble in the solvent; and applying the composition of matter onto a substrate such that the carbon dioxide separates from the surfactant and wherein the surfactant coats the substrate.

In another aspect, the invention provides compositions of matter comprising (1) at least one surfactant comprising at least one phosphate group and (2) a solvent comprising carbon dioxide.

These and other aspects of the invention are described in greater detail herein.

BRIEF DESCRIPTION OF THE DRAWINGS

FIG. 2 illustrates cloud point curves for various phosphate-containing surfactants.

FIG. 3 illustrates cloud point curves for various phosphate-containing surfactants.

FIG. 4 illustrates cloud point curves for various phosphate-containing anionic surfactants.

FIG. 5 illustrates cloud point curves for various phosphate-containing anionic surfactants.

FIG. 6 illustrates water uptake for various phosphate-containing anionic surfactants.

DETAILED DESCRIPTION OF THE PREFERRED EMBODIMENTS

Figure 1:
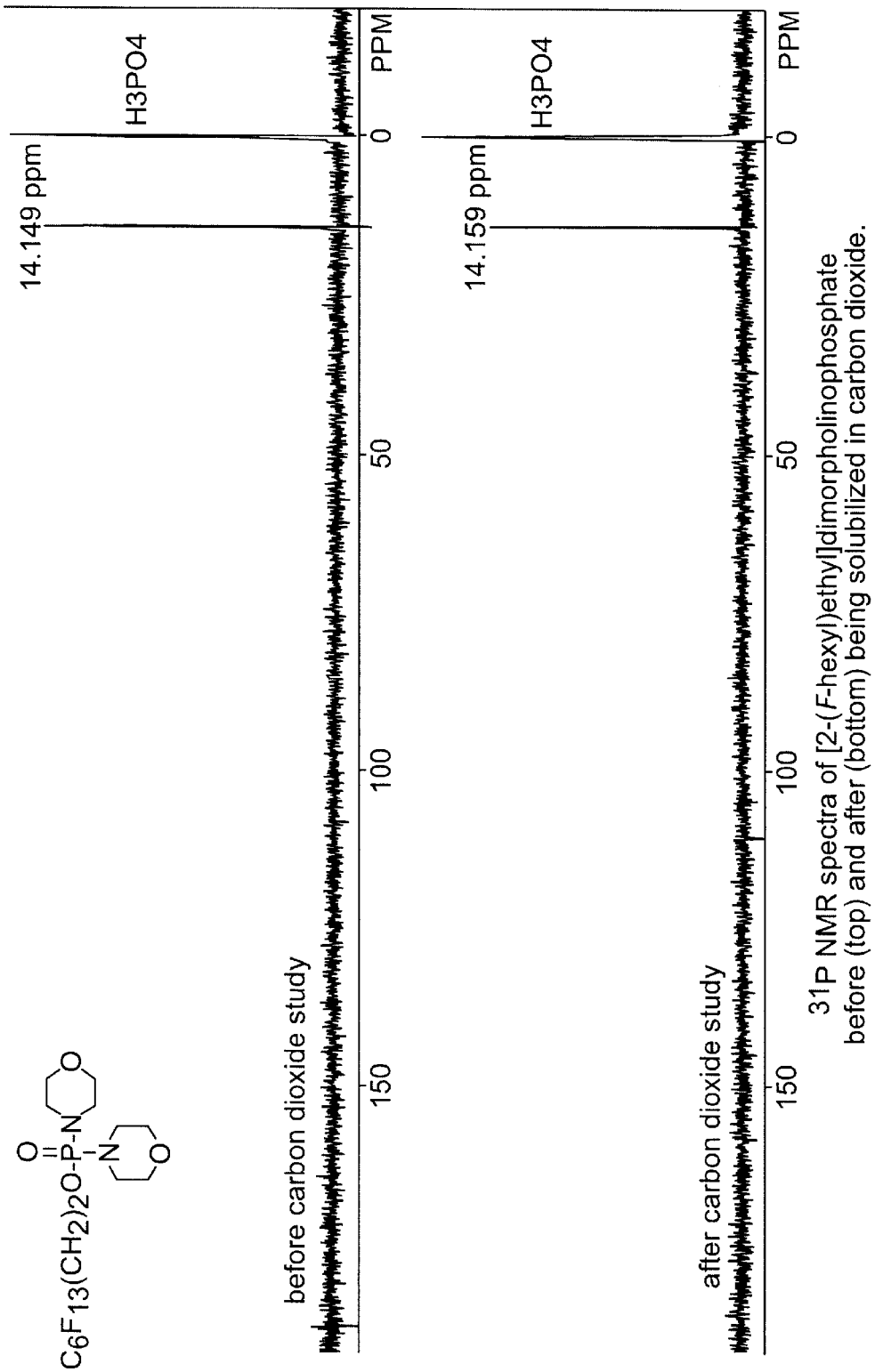
FIG. 1 illustrates a $^{31}$P NMR spectra of [2-(F-hexyl)ethyl] dimorpholinophosphate before (top) and after (bottom) being solubilized in carbon dioxide.

The invention will be described below with respect to its preferred embodiments, drawings, and examples. It should be appreciated that these do not serve to limit the scope of the invention, but instead illustrate the scope of the invention.

In one aspect, the invention relates to a composition of matter. The composition of matter comprises: (1) at least one surfactant comprising at least one phosphate group and (2) a solvent comprising carbon dioxide.

The surfactant may be illustrated in a number of embodiments. In various embodiments, the surfactant comprises at least one fluorocarbon group. For the purposes of the invention, the at least one fluorocarbon group is considered to have an affinity for carbon dioxide, i.e., the at least one fluorocarbon group is "$CO_2$-philic". Preferably, the at least one fluorocarbon group comprises a hydrogen spacer attached to an oxygen atom which is, in turn, attached to the phosphate group.

In various preferred embodiments, the at least one fluorocarbon group is of the formula:

$$C_mF_{2m+1}(CH_2)_nO$$

wherein m ranges from 1 to 24 and n ranges from 1 to 24.

In other embodiments, the surfactant may further comprise a hydrocarbon-containing group attached to the phosphate group. In accordance with the invention, the hydrocarbon-containing group is, in certain embodiments, "$CO_2$-phobic", does not have affinity for carbon dioxide. Nonetheless, it should be appreciated that when present in branched form, the hydrocarbon-containing group may be useful for dispersing charged surfactants in $CO_2$. See Eastoe et al. *Journal of the American Chemical Society;* 2001; 123(5); 988–989.

In a preferred embodiment, the hydrocarbon-containing chain is of the formula:

$$C_mH_{2m+1}O$$

wherein m ranges from 1 to 24.

In various embodiment, the surfactant may be present as an anionic surfactant. Non-limiting examples of anionic surfactants are of the formulas (VIII) and (IX) as well as others set forth in detail hereinbelow:

$$RO-\overset{\overset{O}{\|}}{\underset{RO}{P}}-O^-M^+ \qquad (VIII)$$

$$RO-\overset{\overset{O}{\|}}{\underset{M^+O^-}{P}}-N\overbrace{\qquad}O \qquad (IX)$$

wherein R is a branched or straight chained hydrocarbon (e.g., $C_nH_{2n+1}$ wherein n ranges from 1 to 24) or hydrocarbon/fluorocarbon group and M is a countercation such as, for example, $K^+$, $Na^+$, or $NH_4^+$.

In certain embodiments, the surfactants may be present in the form of hybrid surfactants. For the purposes of the invention, the term "hybrid surfactant" is defined as a surfactant having at least one fluorocarbon group and at least one hydrocarbon-containing group. Examples of these are of the formulas (X), (XI), and (XI'): As set forth below, the hybrid surfactants also encompass anionic surfactants in various embodiments.

$$R_FO-\overset{\overset{O}{\|}}{\underset{R_HO}{P}}-N\overbrace{\qquad}O \qquad (X)$$

$$R_FO-\overset{\overset{O}{\|}}{\underset{R_HO}{P}}-O^-M^+ \qquad (XI)$$

$$R_FO-\overset{\overset{O}{\|}}{\underset{OR_H}{P}}-X_1 \qquad (XI')$$

wherein $R_H$ may be independently selected and is a branched or straight-chained hydrocarbon group (e.g., $C_nH_{2n+1}$ wherein n ranges from 1 to 24). $R_H$ is preferably $C_8H_{17}$ or $C_{14}H_{29}$. In another embodiment, $R_H$ may contain a fluorocarbon group such as, for example, $C_nF_{2n+1}(CH_2)_m$ wherein n ranges from 1 to 24 and m ranges from 1 to 24. $R_F$ is independently selected and is a branched or straight chained fluorocarbon group (e.g., hydrocarbon/fluorocarbon group) (e.g., $C_nF_{2n+1}(CH_2)_m$ wherein n ranges from 1 to 24 and m ranges from 1 to 24) wherein $M^+$ is a countercation such as, for example, $K^+$, $Na^+$, or $NH_4^+$. Preferred groups for $R_H$ are, without limitation, $C_6F_{13}(CH_2)_2$ and $C_{10}F_{21}(CH_2)_2$ and preferred groups for $R_H$ are, without limitation, $C_4H_9$, $C_8H_{17}$, $C_{12}H_{25}$, and $C_{16}H_{33}$. $X_1$ is a functional group such as hydroxy (—OH), alkyl (such that a phosphate bond is formed) and a phosphoamide groups (such as, for example, piperidine, morpholine, and the like). In one preferred embodiment, when $M^+$ is $NH_4^+$, $R_F$ and $R_H$ are each independently selected and preferably range from $C_2F_5(CH_2)_2$ to $C_8F_{17}(CH_2)_2$.

Another preferred anionic surfactant according to the present invention is of the following formula:

$$R_FO-\overset{\overset{O}{\|}}{\underset{(ONH_4)}{P}}-(ONH_4)$$

wherein $R_F$ ranges from $CF_3(CH_2)_n$ to $C_{24}F_{49}(CH_2)_n$ wherein n ranges from 1 to 24.

In other embodiments, the surfactant may be present in the form of a cationic surfactant. Examples of cationic surfactants are, without limitation, those represented by the formulas (VI) and (VII) (e.g., piperazinium phosphates):

(VI)

(VII)

wherein R may be a branched or straight chained hydrocarbon group (e.g., $C_nH_{2n+1}$ wherein n ranges from 1 to 24) or a hydrocarbon/fluorocarbon group including, for example, $C_nF_{2n+1}(CH_2)_m$ wherein n ranges from 1 to 24 and m ranges from 1 to 24, and X is a counteranion which may be a halogen (e.g., chloride, bromide), triflate, or "BarF" (anion of Kobayashi's reagent as set forth below):

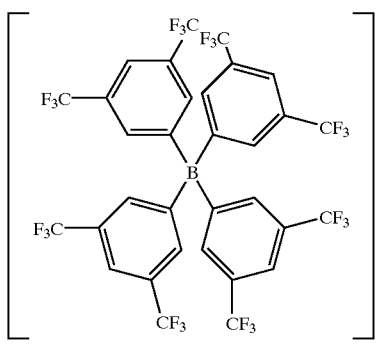

As an example, one or more morpholine units may be attached to the phosphate group. Embodiments represented by formulas (I) through (V) and (IX) and (X) describe such structures. Moreover, certain embodiments illustrate at least one fluorocarbon-containing group attached to the phosphate group. In one example, a fluorocarbon group is attached to a hydrocarbon spacer (e.g., 1 to 12 methylene units long) which is in turn attached to an oxygen atom and then the phosphorous atom as illustrated.

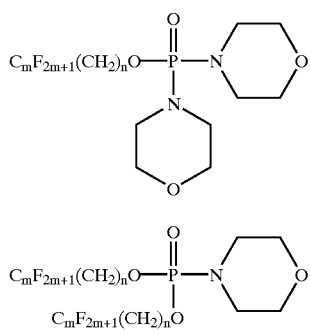

wherein m and n are each independently selected with m ranging from 1 to 24 and n ranging from 1 to 24. In a preferred embodiment, with respect to formula (I), m may be 6, 8, or 10, and n is 2. In a preferred embodiment, with respect to formula (II), m may be 6 or 8 and n is 2.

Hydrocarbon analogs of formulas (III) through (IV) are also encompassed.

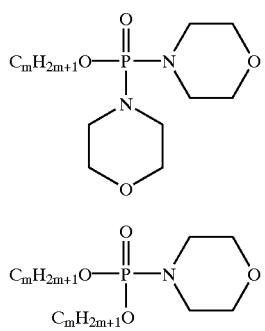

wherein m is independently selected and ranges from 1 to 24. Preferably, m is 10.

Hybrid morpholine-containing surfactants can also be employed and are of the formula:

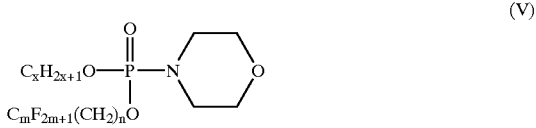

wherein x ranges from 1 to 24, m ranges from 1 to 24, and n ranges from 1 to 24. In a preferred embodiment, x is 8, m is 6, and n is 2.

The surfactants are believed to be potentially capable of reverse micelle and/or water-in carbon dioxide emulsion (i.e., microemulsion) formation. In certain embodiments, such compositions containing water may be present as homogeneous fluids or phases. Accordingly, in another aspect the invention provides a reverse micelle that comprises the composition of matter as defined herein and water. For the purposes of the invention, the term "reverse micelle" is defined as a micelle in which a water component is on the inner portion of the micelle. Thus, the "hydrophilic" segment of each surfactant present in the reverse micelle is on the inner portion of the micelle, while the "$CO_2$-philic" segment of each surfactant is on the outer portion of the micelle. As a result, the surfactants are useful in a number of applications. For example, the reverse micelles may be capable of encapsulating a number of pharmaceutically active agents therein, the selection of which is known to one skilled in the art. In other various embodiments, the surfactants can also be employed in cleaning or water removal in applications such as $CO_2$-based lithography, wherein a relatively small amount of water used in development can be dissolved and "swept away" into the phase containing predominantly carbon dioxide as well as synthesizing nanoparticles within microemulsion water pools. Organic (i.e. polymers) and inorganic nanoparticles can be also prepared using microemulsion water pools as reactors/templates. The surfactants can also be used in extraction applications, e.g., metal extractions from aqueous solutions.

Various amounts of water may be taken-up by the compositions of matter and methods of the present invention. For example, in one embodiment, the amount of water may range from above about 0, 5, 10, 20, 30, or 40 to about 60, 70, 80, 90, 95, 100, 150, or 200 percent based on the weight of the surfactant. More specifically, in accordance with the invention, the surfactant is capable of taking up 100 percent of its own weight in the form of water.

For the purposes of the invention, carbon dioxide is employed in a liquid or supercritical form. The composition of matter typically employs carbon dioxide as a continuous phase, with the composition of matter preferably comprising from about 50, 60, or 75 weight percent to about 80, 90, or 99 weight percent of carbon dioxide. If liquid $CO_2$ is used, the temperature employed during the process is preferably below 31° C. In one preferred embodiment, the $CO_2$ is utilized in a "supercritical" phase. As used herein, "supercritical" means that a fluid medium is at a temperature that is sufficiently high that it cannot be liquefied by pressure. The thermodynamic properties of $CO_2$ are reported in Hyatt, J. Org. Chem. 49: 5097–5101 (1984); therein, it is stated that the critical temperature of $CO_2$ is about 31° C. In particular, the methods of the present invention are preferably carried out at a temperature range from about 20° C. to about 60° C. The pressures employed preferably range from about 1000 psia (6.9 MPa) to about 5500 psia (37.9 MPa).

The composition of matter may also comprise components in addition to those described above. Preferably, these components do not react with the surfactant. Exemplary components include, but are not limited to, polymer modifier, water, rheology modifiers, plasticizing agents, antibacterial agents, flame retardants, and viscosity reduction modifiers. Co-solvents and co-surfactants may also be optionally employed. These components may be used if they do not react with the reactive functional polymer.

Exemplary co-solvents that could be used include, but are not limited to, alcohols (e.g., methanol, ethanol, and isopropanol); fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, butane, n-pentane, and hexanes); oxides (e.g., nitrous oxide); olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin as well as other alkanes and paraffin waxes); petroleum-based solvents and solvent mixtures; and any other compatible solvent or mixture that is available and suitable. Mixtures of the above co-solvents may be used.

Exemplary co-surfactants that may possibly be used include, but are not limited to, longer chain alcohols (i.e., greater than or equal to $C_8$) such as octanol, decanol, dodecanol, cetyl alcohol, laurel alcohol, and the like; and species containing two or more alcohol groups or other hydrogen bonding functionalities; amides; amines; and other like components. Suitable other types of materials that are useful as co-surfactants are well known by those skilled in the art, and may be employed in the composition of matter of the present invention. Mixtures of the above may be used.

The invention also provides a method of the separating the surfactant from the carbon dioxide and applying the surfactant to a substrate. In particular, the method comprises providing a composition of matter comprising at least one surfactant comprising (1) at least one phosphate group and (2) a solvent comprising carbon dioxide, wherein at least a portion of the surfactant is soluble in the solvent; and applying the composition of matter onto a substrate such that the carbon dioxide separates from the surfactant and wherein the surfactant coats the substrate. Techniques for separating and applying materials to a substrate are known in the art and are described, for example, in U.S. Pat. No. 5,863,612 to DeSimone et al., the disclosure of which is incorporated herein by reference in its entirety, such as found on col. 5, line 47 through col. 6, line 11. Examples of methods for separating the surfactant include, without limitation, boiling off the carbon dioxide and leaving the surfactant behind, and precipitation of the surfactant into a non-solvent either by introducing a non-solvent to a vessel or reactor containing the surfactant or the transfer of the vessel or reactor contents to another vessel containing a non-solvent for the surfactant. In one embodiment, the separation and application steps may be carried out together and include, as an example, passing (e.g., spraying or spray-drying) a solution containing the surfactant through an orifice to form particles, powder coatings, fibers, and other coatings on the substrates. A wide variety of substrates may be employed such as, without limitation, metals, organic polymers, inorganic polymers, textiles, and composites thereof. Exemplary substrates include, without limitation, integrated circuits, silicon wafers, silicon wafers with vias containing water, low-dielectric constant surfaces used as interlayer dielectrics on integrated circuits, a MEM, a porous material, a microporous material, a nano-porous material, a non-woven material, surfaces to be cleaned, surfaces to be treated with passivation layers, surfaces to be coated, surfaces to be treated with a self-assembled monolayer ("SAM"), photoresist coated surfaces, optical interfaces, optical relays, optical fibers, metallized surfaces, and micromirrors. These application techniques are demonstrated for liquid and supercritical solutions. The surfactant may form a low surface energy coating on the substrate. Examples of embodiments of substrates include, without limitation, textiles, papers, fiber optics, as well as other surfaces.

The compositions of matter, and in particular the surfactant, are useful in a number of applications such as, but not limited to, cleaning processes, solvent pool formation for polymerization processes, inorganic particle synthesis, and enzymatic reactions.

The composition of matter may include various amounts of surfactant. In a preferred embodiment, the composition of matter comprises from about 1, 2, 5, or 7 to about 5, 8, 10, 15, or 20 percent by weight of surfactant.

In another aspect, the invention provides a method of removing water from a composition of matter. The method comprises contacting a first composition of matter comprising water with a second composition of matter comprising: (1) at least one surfactant comprising at least one phosphate group and (2) a solvent comprising carbon dioxide, wherein at least a portion of the surfactant is soluble in the solvent, such that the at least one surfactant removes at least a portion of the water from the first composition.

Embodiments describing the second composition of matter comprising the surfactant are set forth hereinabove, as well as for the solvent comprising carbon dioxide. In a preferred embodiment, the second composition of matter may be present as a homogeneous phase prior to and after contacting the first composition of matter, although other embodiments may also be contemplated, i.e., the second composition of matter may be heterogeneous.

The first composition of matter comprising water may be present in the form of a number of embodiments, such as, for example, various articles of manufacture. Examples of such embodiments include, without limitation, integrated circuits, silicon wafers, silicon wafers with vias containing water, low-dielectric constant surfaces used as interlayer dielectrics on integrated circuits, a MEM, a porous material, a microporous material, a nano-porous material, a non-woven material, surfaces to be cleaned, surfaces to be treated with passivation layers, surfaces to be coated, surfaces to be treated with a self-assembled monolayer ("SAM"), photoresist coated surfaces, optical interfaces, optical relays, optical fibers, metallized surfaces, and micromirrors.

Methods for carrying out water removal may be conducted in systems, vessels, cells, and apparatuses known to one skilled in the art. Such systems, vessels, cells, and apparatuses include, without limitation, those capable of withstanding high pressure. Such equipment may be optionally contain agitation and heating means, the selection of which is known. The methods of water removal may be carried out by employing batch, continuous, and semi-continuous systems.

The surfactants that are employed in the invention may be formed by various techniques such as, for example, as set forth in Sadtler, V. M.; Jeanneaux, F.; Krafft, M. P.; Rábai, J.; Riess, J. G. *New Journal of Chemistry*. 1998, 609. Other synthesis routes may also be used. As an example, morpholinosurfactants having fluorocarbon units attached thereto may be formed by first phosphorylation of a fluorinated alcohol by phosphorus oxychloride in the presence of $N(CH_2CH_3)_3$ and $(CH_3CH_2)_2O$. In one embodiment, the formation of di- and triesters and the chlorination of the alcohol can potentially be avoided by using dry ether and an excess of triethylamine, which results in the precipitation of triethylammonium chloride. (Perfluoroalkyl) alkyldimorpholinophosphates are subsequently obtained obtained by a reaction with morpholine. The synthesis of bis[(F-alkyl)alkyl]monomorpholinophosphates also may involve the direct phosphorylation of F-alkylated alcohols by $OPCl_3$, followed by reaction with morpholine as described in Sadtler, V. M., et al.

Piperazine surfactants may be made by following the teachings of Katritzky, A. R., Davis, T. L., Rewcastle G. W., Rubel, G. O., and Pike, M. T., *Langmuir* 1988 4, 732–735. In accordance with the teachings set forth in Katritzky, et al., the following synthesis path may be followed for forming sulfonyl piperazinium compounds:

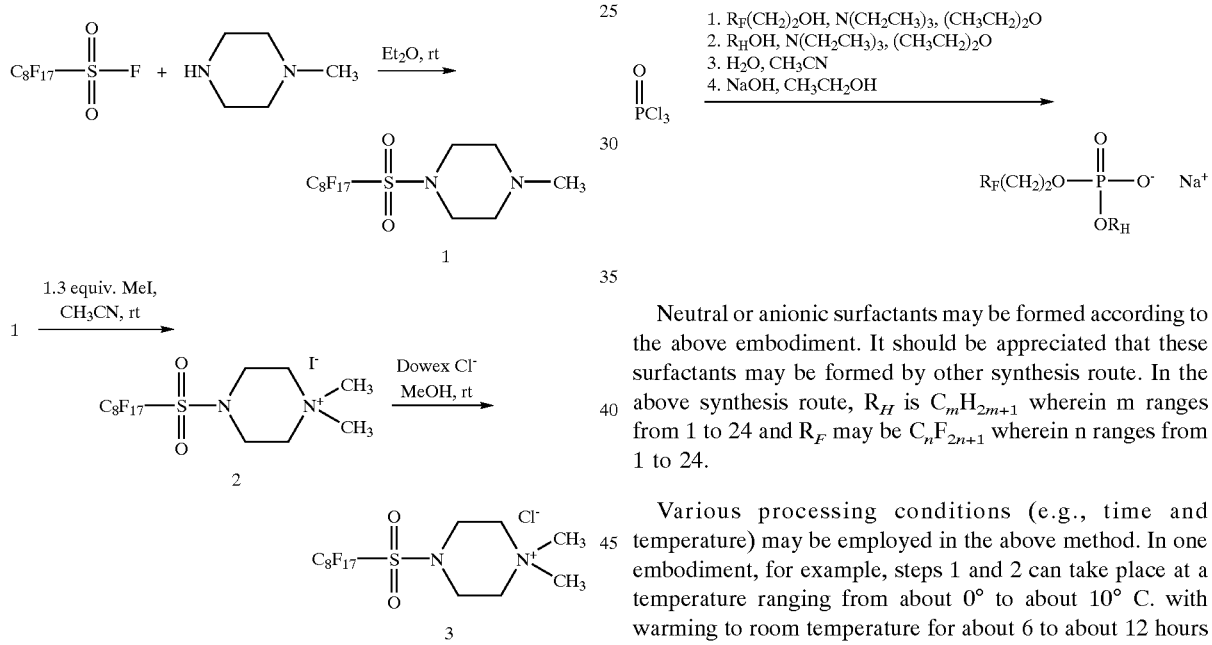

It is believed that one can form piperazinium phosphate surfactants by substituting N-methylpiperazine for morpholine in the synthetic pathway utilized for morpholinophosphate surfactant synthesis. The methylated nitrogen can then be quaternized by iodomethane to provide one variant of the desired compounds. An exemplary synthesis route is given below.

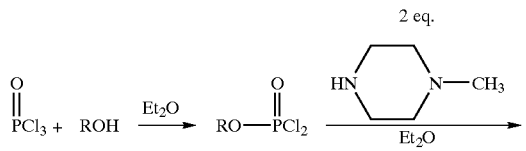

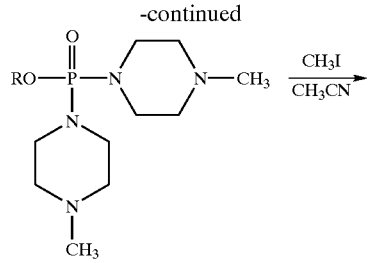

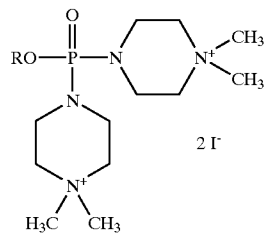

An embodiment illustrating a synthesis route for hybrid surfactants is illustrated according to the following scheme:

1. $R_F(CH_2)_2OH$, $N(CH_2CH_3)_3$, $(CH_3CH_2)_2O$
2. $R_HOH$, $N(CH_2CH_3)_3$, $(CH_3CH_2)_2O$
3. $H_2O$, $CH_3CN$
4. $NaOH$, $CH_3CH_2OH$ $PCl_3 \longrightarrow$ $R_F(CH_2)_2O-\overset{O}{\underset{OR_H}{P}}-O^-$ $Na^+$ Neutral or anionic surfactants may be formed according to the above embodiment. It should be appreciated that these surfactants may be formed by other synthesis route. In the above synthesis route, $R_H$ is $C_mH_{2m+1}$ wherein m ranges from 1 to 24 and $R_F$ may be $C_nF_{2n+1}$ wherein n ranges from 1 to 24.

Various processing conditions (e.g., time and temperature) may be employed in the above method. In one embodiment, for example, steps 1 and 2 can take place at a temperature ranging from about 0° to about 10° C. with warming to room temperature for about 6 to about 12 hours under an inert atmosphere (e.g., nitrogen or argon). Steps 3 and 4 take place under ambient conditions. The above synthesis employs equipment and techniques known in the art such as conventional glass round bottom flasks and stir bars. Other types of equipment can also be employed.

The following examples are intended to illustrate the present invention, and are not intended to limit the scope of the invention. In the examples, the morpholinophosphate surfactants were prepared as described in Sadtler, V. M. et al. These compounds were purified by silica gel chromatography. The anionic phosphate surfactants were synthesized by adapting known methods for preparing phosphates with fluorinated chains (see Krafft, M. -P.; Rolland, J. -P.; Vierling, P.; Riess, J. G. *New Journal of Chemistry* 1990, 14, 869.) and forming the sodium salt via neutralization in ethanol (see Romsted, L. S.; Zanette, D. *J. Phys. Chem.* 1988, 92, 4690.). The compounds exhibited the expected 1H, 19F, and 31P NMR spectral patterns and also possessed adequate purity as determined by elemental analysis (Atlantic Microlabs, Norcross, Ga.), i.e., defined as generally within 0.3% of the expected calculated analytical elemental percentages.)

Cloud point solubilities of surfactants and surfactants and water in carbon dioxide were carried out using a HIP variable volume pressure generator/view cell (maximum volume=15 mL) containing a 0.5 inch thick sapphire window for viewing and a magnetic stir bar to agitate the solution. $CO_2$ was injected with the aid of an ISCO compression pump connected to the cell through high-pressure steel tubing. The cell was further attached to a Sensotec pressure transducer and an Omega thermocouple for pressure and temperature readouts, respectively. Measured amounts of surfactant and water were added at room temperature prior to pressurization with $CO_2$. Samples were heated (controlled to ±0.1° C.) in the cell through the use of variac-controlled heating tape. Cloud points (judged as the reversible onset of a visually fully opaque solution) were taken on the cooling cycle by isothermally varying the pressure through volume changes facilitated by the hand-controlled piston. The cell was tipped at a downward angle to aid in the observation of any phase-separated liquids. The cell was cleaned thoroughly between experiments.

UV-Vis spectra were acquired using a Perkin Elmer Lambda 40 spectrometer. Pressurized solutions were prepared in a 2.5 mL stainless steel cell, equipped with two 1 in. diameter×⅝ in. thick sapphire windows enclosing a 1 cm solution path length. Appropriate amount of surfactant and water were placed into the cell chamber, along with a ¼ in. magnetic stir bar for agitation. A film of methyl orange (for a concentration of $5 \times 10^{-5}$ M) was pre-cast and dried on one of the sapphire windows by addition of a stock solution via syringe. The chamber was tightly sealed, and the cell was pressurized and stirred until a clear, one-phase solution was present.

EXAMPLES 1–7

$CO_2$ Solubility Evaluation

The $CO_2$ solubility of the surfactants was carried out using a stainless steel view cell (2.5 mL internal volume) specially designed for high pressure studies. $CO_2$/surfactant solutions were held within two sapphire glass windows (sealed with Teflon® o-rings) which were, in turn, held in place by threaded steel caps fit to brass washers. Attached to the cell were steel tubings for injecting $CO_2$ and for venting the system, as well as a thermocouple and transducer to monitor internal temperature and pressure, respectively. $CO_2$ was transferred to the cell by way of an ISCO single pump compressor. A ¼ inch magnetic bar was included to stir solutions. The chamber temperature could be raised with the aid of variac-controlled heating elements.

Experiments involved adding weighed amounts of the surfactants into the chamber along with the stir bar, tightly sealing the chamber, and injecting $CO_2$ to pressures between 1000 and 1500 psig at room temperature. The solutions were stirred and the temperatures increased at a rate of approximately 1° C./minute. Temperatures, pressures, and solution appearances were recorded. The results are listed in Table 1. The fluorosurfactants were soluble (i.e, dissolved in clear, transparent solutions) at concentrations of 10 percent (w/v) over temperatures up to 60° C., and exhibited no cloud points. Hydrocarbon analogs also proved to be soluble over similar pressure and temperature ranges.

TABLE 1

Solubilities of Morpholinophosphate Surfactants in Dense $CO_2$ (2.5 mL volume)

| Surfactant | Weight of Sample (g) | Temperature Range (° C.) | Pressure Range (psig) | Solubility |
|---|---|---|---|---|
| 1 | 0.304 | 24–60 | 1070–2360 | Clear Solution |
| 2 | 0.298 | 24–53 | 1050–1820 | Clear Solution |
| 3 | 0.253 | 23–60 | 1100–2500 | Clear Solution |
| 4 | 0.259 | 25–59 | 1010–1760 | Clear Solution |
| 5 | 0.258 | 25–59 | 1070–2100 | Clear Solution |
| 6 | 0.253 | 23–59 | 1270–2960 | Clear Solution |
| 7 | 0.139 | 24–59 | 1250–2860 | Clear Solution |

Fluorosurfactants

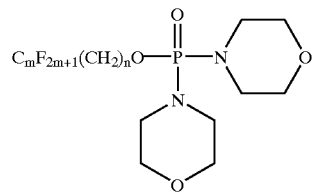

Dimorpholinophosphate

1: m = 6, n = 2
2: m = 8, n = 2
3: m = 10, n = 2

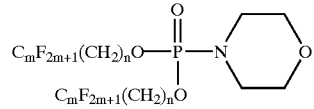

Monomorpholinophosphate

4: m = 6, n = 2
5: m = 8, n = 2

Hydrocarbon Analogs (Control Compounds)

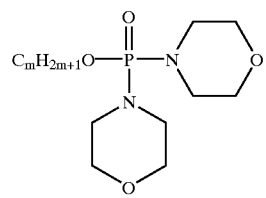

6: m = 10

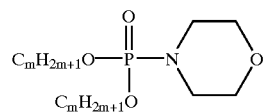

7: m = 10

EXAMPLE 8

Synthesis of Bis-[2-(F-hexyl)ethyl]phosphate, sodium salt

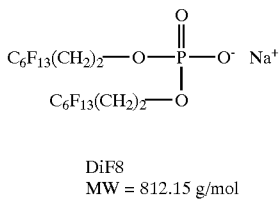

DiF8
MW = 812.15 g/mol

Bis-[2-(F-hexyl)ethyl]phosphate, sodium salt was synthesized according to the following example. Phosphorous oxychloride (5.27 g, 34.3 mmol) was added via syringe to 200 mL anhydrous diethyl ether, under nitrogen. The mixture was cooled to 0° C., and a solution of 1H,1H,2H,2H-perfluorooctanol (25 g, 68.7 mmol) and triethylamine (17.4 g, 172 mmol) in 100 mL diethyl ether was slowly added, leading to the formation of white precipitate. The solution warmed to room temperature and was allowed to stir further under nitrogen overnight. The resulting white solid (triethylamine hydrochloride salt) was filtered and washed with 100 mL diethyl ether. The solvent and excess triethylamine was removed via rotary evaporation, providing an orange oil which was dissolved in 100 mL acetonitrile and 5 mL water. Two layers of immiscible liquids resulted, and the lower layer was isolated and dried under rotary evaporation. 22.5 g of crude as a viscous orange oil was provided. The oil was taken up in 100 mL ethanol. 2.28 g of NaOH (50 wt. % in water, 28.5 mmol NaOH) solution dissolved in 20 mL ethanol was slowly added. The solution precipitated into a gel, which was allowed to stir overnight. A white sticky solid (~3 g) was filtered and discarded, and the filtrate was concentrated via rotary evaporation and precipitated with diethyl ether. The resulting solid was dried and then taken up in 100 mL, and 1 g decolorizing carbon was added to the solution. This resulting solution was briefly stirred. The carbon was filtered off and solvent evaporated. 14.9 g (53%) of the desired product after vacuum drying was provided (mp >220° C.).

$^1$H NMR: (300 MHz: δ, CD$_3$OD) 4.13 (q, 4H; J$_{HH}$: 6.6 Hz, J$_{HP}$: 6.8 Hz; CH$_2$O), 2.55 (tt, 4H; J$_{HH}$: 6.6 Hz, J$_{HF}$: 19.2 Hz; CF$_2$CH$_2$). $^{19}$F NMR: (282 MHz: δ, CD$_3$OD) −83.0 (CF$_2$CF$_3$), −115.1 (CH$_2$CF$_2$), −123.2, −124.2, −125.0, (3×CF$_2$), −127.7 (CF$_2$CF$_3$). $^{31}$P NMR: (121 MHz: δ, CD$_3$OD) −0.65 ppm. Anal. Calcd.: C:23.66, H: 0.99; Found: C: 23.46; H 1.00.

EXAMPLE 9

Synthesis of [2-(F-decyl)ethyl]octylphosphate, sodium salt

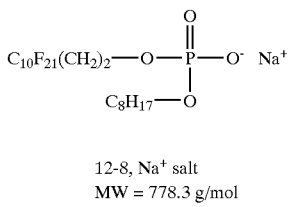

12-8, Na$^+$ salt
MW = 778.3 g/mol 2-(F-decyl)ethyl]octylphosphate, sodium salt was synthesized as follows. Phosphorous oxychloride (1.3 g, 8.6 mmol) was added via syringe to 25 mL anhydrous diethyl ether, under argon. The mixture was cooled to 0° C., and a solution of 1H,1H,2H,2H-perfluorododecanol (4.65 g, 8.2 mmol) and triethylamine (2.1 g, 20.8 mL) in 25 mL diethyl ether was slowly added. A white precipitate then formed. The mixture was stirred for 1 h at 0° C., and a solution of 1-octanol (1.1 g, 8.2 mmol) and triethylamine (2.1 g, 20.8 mL) in 25 mL diethyl ether was added to the solution, resulting in the formation of more white precipitate. The solution was allowed to come to room temperature and was stirred under argon overnight. The white solid (triethylamine hydrochloride salt) was filtered and the filtrate was condensed via rotary evaporation and dissolved in a 20 mL mixture of acetonitrile and chloroform (19/1). 1 mL of water was slowly added and the solution was stirred overnight, providing a white solid, which was washed with acetonitrile and filtered. The solid was triturated in chloroform, the insoluble material filtered away, and the chloroform removed via rotary evaporation to provide 3.0 g of the neutral phosphate (48.4 percent) The corresponding sodium salt was prepared in quantitative yield via neutralization with 1 equivalent of sodium hydroxide in ethanol (mp >225° C.).

$^1$H NMR: (300 MHz: δ, CD$_3$OD) 4.14 (q, 2H; R$_F$ chain CH$_2$O), 3.84 (q, 2H; R$_H$ chain CH$_2$O), 2.55 (m, 2H; CF$_2$CH$_2$),1.6 (m, 2H; CH$_2$CH$_2$CH$_2$O), 1.2–1.4 (m, 10H), 0.88 (t, 3H; J$_{HH}$: 7.1 Hz). $^{19}$F NMR: (282 MHz: δ, CD$_3$OD) −81.4 (CF$_2$CF$_3$), −113.3 (CH$_2$CF$_2$), −121.4, −122.4, −123.4, (7×CF$_2$), −126.0 (CF$_2$CF$_3$). $^{31}$P NMR: (121 MHz: β, CD$_3$OD) 1.53. Anal. Calcd.: C: 30.86, H: 2.72; Found: C: 30.73, H: 2.62.

EXAMPLE 10

Synthesis of Di-Fluoro-Chained Analog Surfactant

Di-fluoro chained analog surfactants were formed according to the following synthesis route:

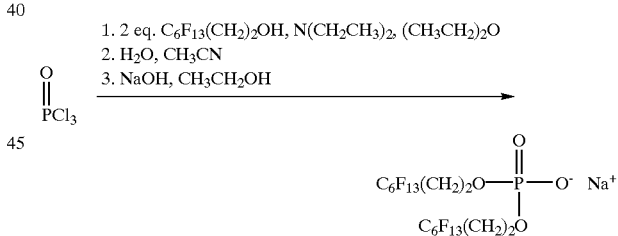

EXAMPLE 11

Cloud Point Evaluation

The solubilities of various surfactants of the formula described below were evaluated in carbon dioxide:

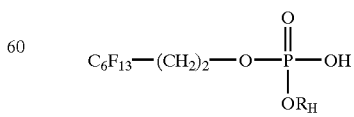

wherein R$_H$ is C$_4$H$_9$ ("8-4"), C$_8$H$_{17}$ ("8-8"), C$_{12}$H$_{25}$ ("8-12"), and C$_{16}$H$_{33}$ ("8-16"). Cloud point curves for these surfactants are set forth in FIG. 2.

EXAMPLE 12

Cloud Point Evaluation

The solubilities of various surfactants of the formula described below were evaluated in carbon dioxide:

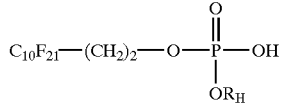

wherein $R_H$ is $C_4H_9$ ("12-4"), $C_8H_{17}$ ("12-8"), and $C_{12}H_{25}$ ("12-12"). Cloud point curves for these surfactants are set forth in FIG. 3.

EXAMPLE 13

Cloud Point Evaluation (Anionic Surfactant)

The solubility of an anionic surfactant of the formula described below was evaluated in carbon dioxide:

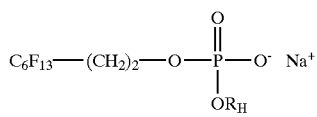

wherein $R_H$ is $C_4H_9$ ("8-4"). A cloud point curve for this surfactant is set forth in FIG. 4.

EXAMPLE 14

Cloud Point Evaluation (Anionic Surfactants)

The solubility of an anionic surfactant of the formula described below was evaluated in carbon dioxide:

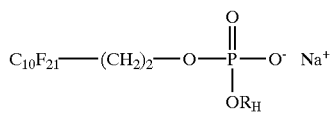

wherein $R_H$ is $C_4H_9$ ("12-4") and $C_8H_{17}$ ("12-8"). A cloud point curve for this surfactant is set forth in FIG. 5.

EXAMPLE 15

Water Uptake Evaluation (Anionic Surfactant)

The water uptake capability of an anionic surfactant was evaluated wherein the surfactant is of the formula:

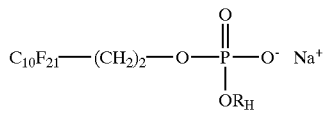

wherein $R_H$ is $C_4H_9$ ("12-4").
The concentration of surfactant in carbon dioxide was 2.5 weight percent. The results are set forth in FIG. 6.

EXAMPLE 16

Water Uptake Evaluation (Anionic Surfactants)

Figure 7:
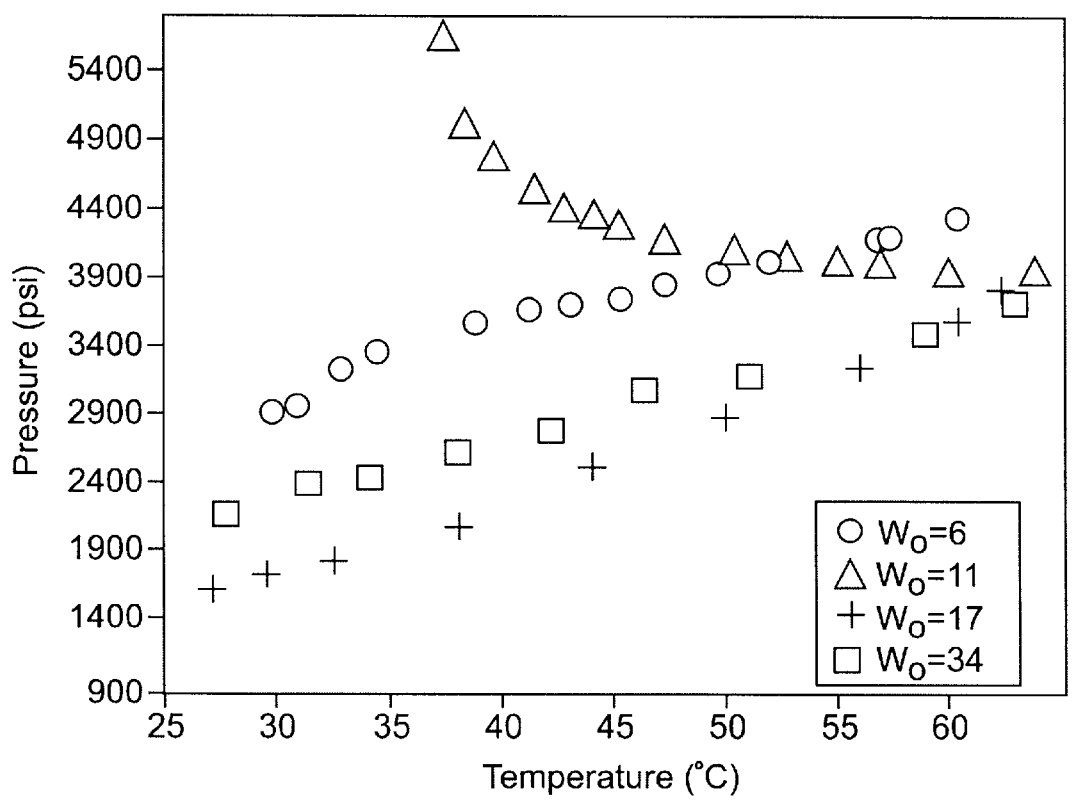
FIG. 7 illustrates water uptake for various phosphate-containing anionic surfactants.

The water uptake capability of an anionic surfactant was evaluated wherein the surfactant is of the formula:

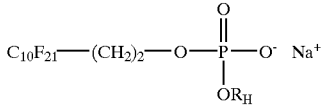

wherein $R_H$ is $C_4H_{17}$ ("12-8").
The concentration of surfactant in carbon dioxide was 2.5 weight percent. The results are set forth in FIG. 7.

EXAMPLE 17

Water Uptake Evaluation (Anionic Surfactants)

Figure 8:
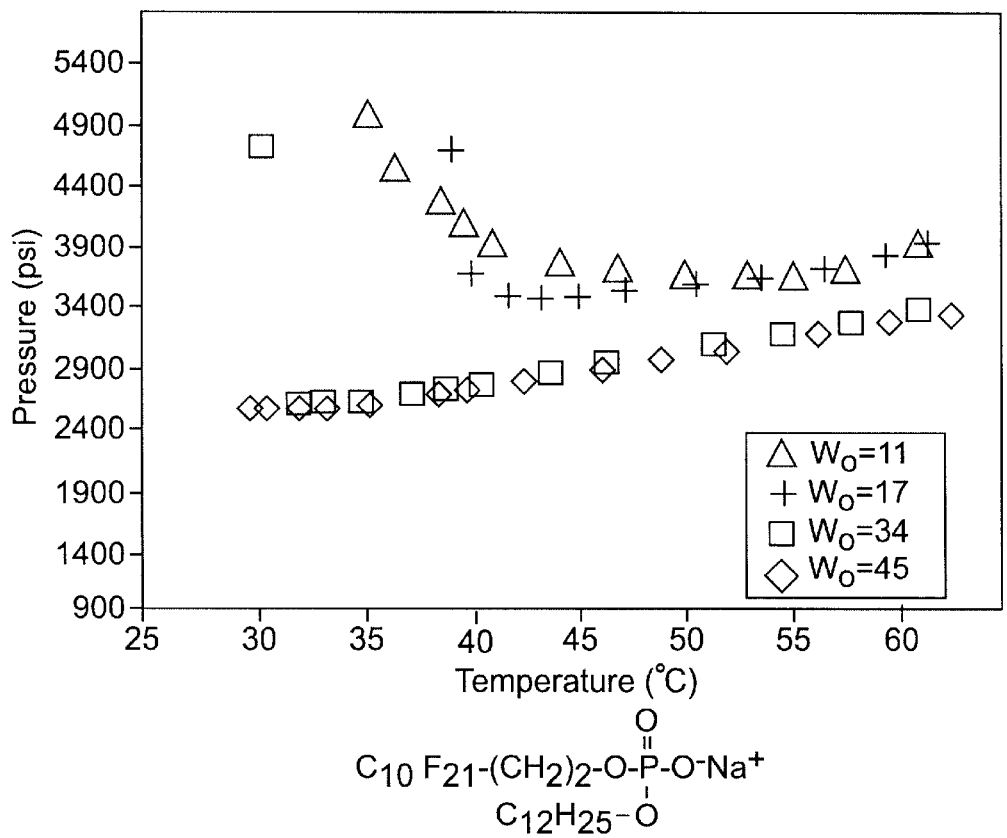
FIG. 8 illustrates water uptake for various phosphate-containing anionic surfactants.

The water uptake capability of an anionic surfactant was evaluated wherein the surfactant is of the formula:

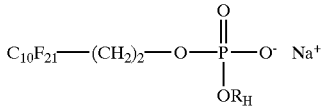

wherein $R_H$ is $C_{12}H_{25}$ ("12-12").
The concentration of surfactant in carbon dioxide was 2.5 weight percent. The results are set forth in FIG. 8.

EXAMPLE 18

Water Uptake Evaluation (Anionic Surfactants)

The water uptake capability of an anionic surfactant was evaluated wherein the surfactant is of the formula:

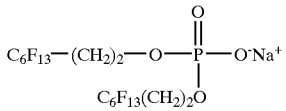

Figure 9:
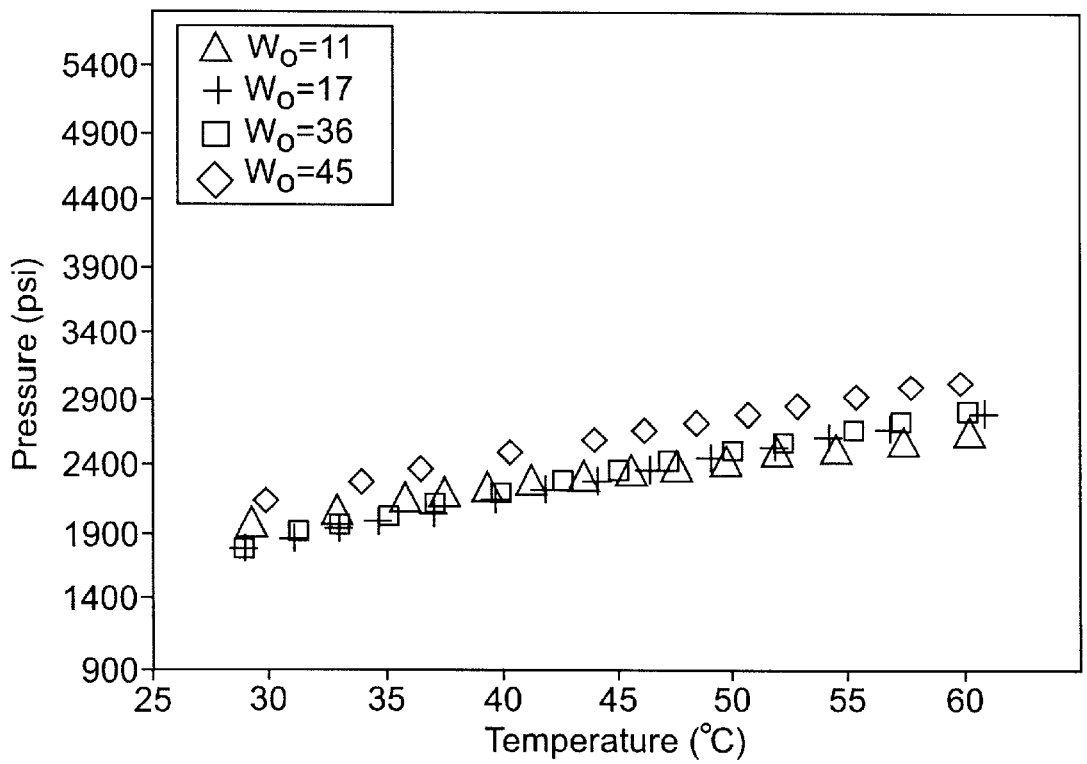
FIG. 9 illustrates water uptake for various phosphate-containing anionic surfactants.

The concentration of surfactant in carbon dioxide was 2.5 weight percent. The results are set forth in FIG. 9.

In the specification, drawings, and examples there have been disclosed typical preferred embodiments of the invention and, although specific terms are employed, they are used in a generic and descriptive sense only and not for the purposes of limitation, the scope of the invention being set forth in the following claims.

That which is claimed:

1. A method of removing water from a composition of matter, said method comprising:
    contacting a first composition of matter comprising water with a second composition of matter comprising: (1) at least one surfactant comprising at least one phosphate group and (2) a solvent comprising carbon dioxide, wherein at least a portion of the surfactant is soluble in the solvent, such that the at least one surfactant removes at least a portion of the water from the first composition.

2. The method according to claim 1, wherein the first composition of matter is present in an embodiment selected from the group consisting of integrated circuits, silicon wafers, silicon wafers with vias containing water, low-dielectric constant surfaces used as interlayer dielectrics on integrated circuits, a MEM, a porous material, a microporous material, a nano-porous material, a non-woven material, surfaces to be cleaned, surfaces to be treated with passivation layers, surfaces to be coated, surfaces to be treated with a self-assembled monolayer ("SAM"), photoresist coated surfaces, optical interfaces, optical relays, optical fibers, metallized surfaces, and micromirrors.

3. The method according to claim 1, wherein the at least one surfactant comprises at least one fluorocarbon group.

4. The method according to claim 3, wherein the at least one fluorocarbon group comprises a hydrocarbon spacer attached to an oxygen atom, wherein the oxygen atom is attached to the phosphate group.

5. The method according to claim 3, wherein the at least one fluorocarbon group is of the formula:

$$C_mF_{2m+1}(CH_2)_nO$$

wherein m ranges from 1 to 24 and n ranges from 1 to 24.

6. The method according to claim 5, wherein said surfactant further comprises a hydrocarbon-containing group attached to the phosphate group.

7. The method according to claim 6, wherein the hydrocarbon-containing chain is of the formula:

$$C_mH_{2m+1}O$$

wherein m ranges from 1 to 24.

8. The method according to claim 1, wherein the surfactant is represented by the formula:

$$R_FO-\overset{\overset{O}{\|}}{\underset{OR_H}{P}}-X_1 \qquad (XI')$$

wherein $R_H$ is, $C_nH_{2n+1}$ wherein n ranges from 1 to 24 or $C_nF_{2n+1}(CH_2)_m$ wherein n ranges from 1 to 24 and m ranges from 1 to 24 or $C_pH_{2p+1}$ wherein p rages from 1 to 24, $R_F$ is $C_nF_{2n+1}(CH_2)_m$ wherein n ranges from 1 to 24 and m ranges from 1 to 24, and $X_I$ is a functional group selected from the group consisting of hydroxy, alkyl, and phosphoamide groups.

9. The method according to claim 1, wherein the surfactant is an anionic surfactant.

10. The method according to claim 9, wherein the anionic surfactant is represented by the formula:

$$R_FO-\overset{\overset{O}{\|}}{\underset{R_HO}{P}}-O^-M^+ \qquad (XI)$$

wherein $R_H$ is, $C_nH_{2n+1}$ wherein n ranges from 1 to 24 or $C_nF_{2n+1}(CH_2)_m$ wherein n ranges from 1 to 24 and m ranges from 1 to 24, $R_F$ is $C_nF_{2n+1}(CH_2)_m$ wherein n ranges from 1 to 24 and m ranges from 1 to 24, and M is $K^+$, $Na^+$, or $NH_4^+$.

11. The method according to claim 9, wherein $R_F$ is selected from the group consisting of $C_6F_{13}(CH_2)_2$ and $C_{10}F_{21}(CH_2)_2$, $R_H$ is selected from the group consisting of $C_4H_9$, $C_8H_{17}$, $C_{12}H_{25}$, and $C_{16}H_{33}$, and M is $Na^+$.

12. The method according to claim 1, wherein the surfactant is a cationic surfactant.

13. The method according to claim 12, wherein the cationic surfactant is selected from the group consisting of:

(VI)

RO—P(=O)(—N(piperazine)N+(CH3)2)—N(piperazine)N+(CH3)2   2X⁻ and (VII)

RO—P(=O)(OR)—N(piperazine)N+(CH3)2   X⁻ wherein R is selected from the group consisting of $C_nH_{2n+1}$ wherein n ranges from 1 to 24 and $C_nF_{2n+1}(CH_2)_m$ wherein n ranges from 1 to 24 and m ranges from 1 to 24, and wherein X is a counteranion selected from the group consisting of halogen, triflate, and

[tetrakis(3,5-bis(trifluoromethyl)phenyl)borate anion].

14. The method according to claim 1, wherein the surfactant comprises one or more one or more morpholine units attached to the phosphate group.

15. The method according to claim 14, wherein the surfactant is selected from the group consisting of (I)

$C_mF_{2m+1}(CH_2)_nO$—P(=O)(—N(morpholine))—N(morpholine)

(II)

$C_mF_{2m+1}(CH_2)_nO$—P(=O)(O(CH2)nC mF2m+1)—N(morpholine)

-continued

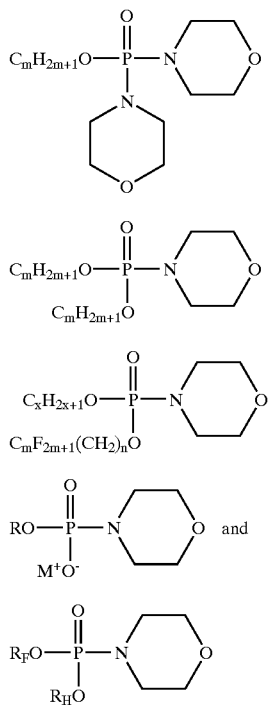

(III)
(IV)
(V)
(IX)
(X)

wherein m and n are independently selected with m ranging from 1 to 24 and n ranging from 1 to 24, x ranges from 1 to 24, M is selected from the group consisting of $K^+$, $Na^+$, and $NH_4^+$, R is $C_pH_{2p+1}$ wherein p rages from 1 to 24 $R_F$ is $C_nF_{2n+1}$ wherein n ranges from 1 to 24, and $R_H$ is either: (1) $C_nH_{2n+1}$ wherein n ranges from 1 to 24 or (2) $C_nF_{2n+1}(CH_2)_m$ wherein n ranges from 1 to 24 and m ranges from 1 to 24.

16. The method according to claim 1, wherein the carbon dioxide is supercritical carbon dioxide.

17. The method according to claim 1, wherein the carbon dioxide is liquid carbon dioxide.

18. The method according to claim 1, wherein said surfactant is present in said composition of matter in an amount ranging from about 1 to about 10 percent based on the weight of the surfactant.

19. The method according to claim 1, further comprising at least one additional component selected from the group consisting of polymer modifier, rheology modifiers, plasticizing agents, antibacterial agents, flame retardants, viscosity reduction modifiers, co-solvents, and co-surfactants.

20. The method according to claim 1, wherein the water and the surfactant in the second composition of matter form a reverse micelle.

21. The method according to claim 1, wherein the water is present in the second composition of matter in an amount ranging from above about 0 to about 200 percent based on the weight of the surfactant.

* * * * *